(No Model.)
W. W. TUCKER.
PIPE CUTTER.
No. 532,845. Patented Jan. 22, 1895.
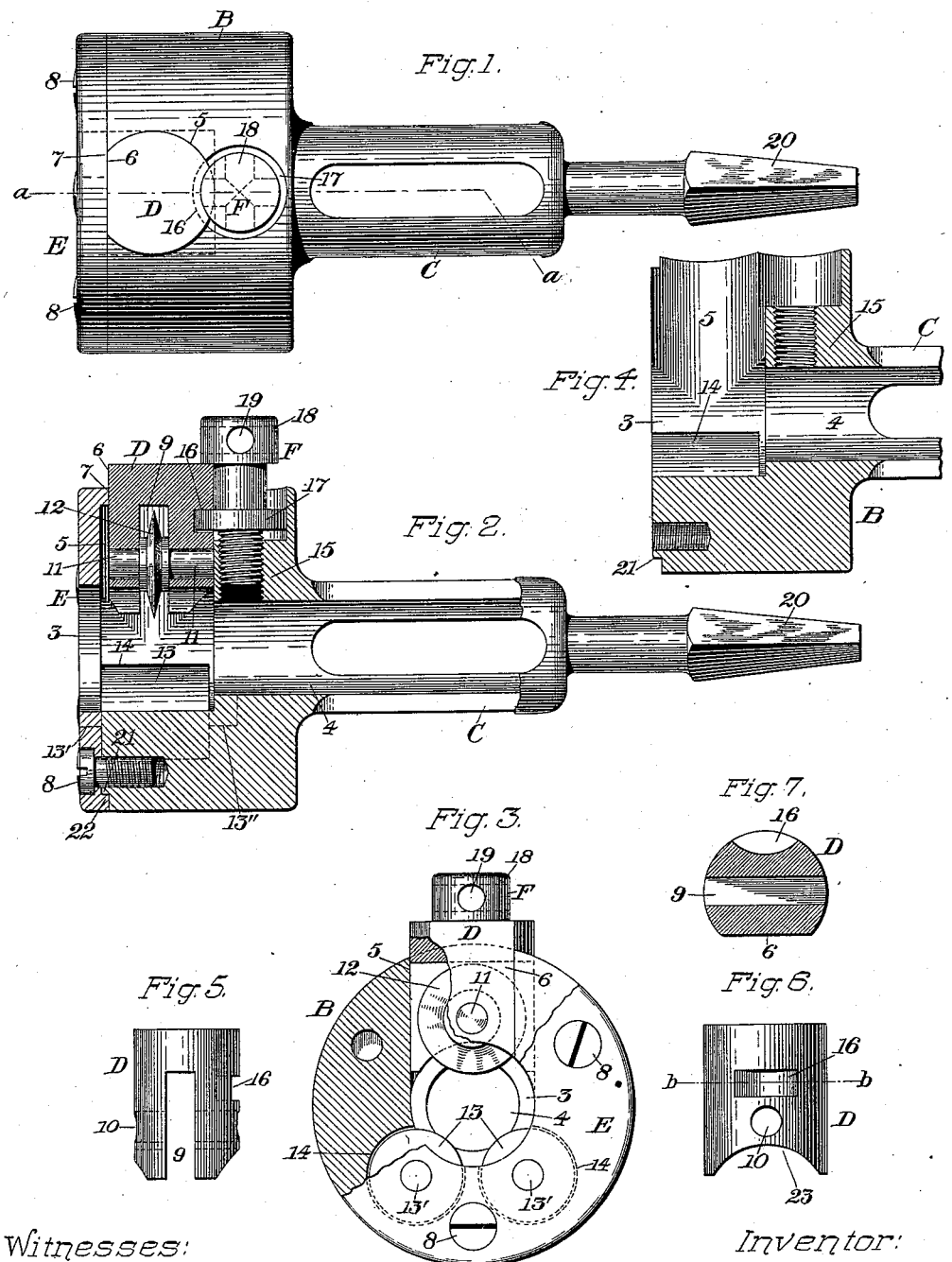
Witnesses:
John L. Edwards Jr.
Fred. J. Dole.
Inventor:
William W. Tucker.
By his Attorney,
F. H. Richards

UNITED STATES PATENT OFFICE.

WILLIAM W. TUCKER, OF HARTFORD, CONNECTICUT.

PIPE-CUTTER.

SPECIFICATION forming part of Letters Patent No. 532,845, dated January 22, 1895.

Application filed April 6, 1894. Serial No. 506,591. (No model.)

*To all whom it may concern:*

Be it known that I, WILLIAM W. TUCKER, a citizen of the United States, residing at Hartford, in the county of Hartford and State of Connecticut, have invented certain new and useful Improvements in Pipe-Cutters, of which the following is a specification.

This invention relates to that class of cutting-off tools known as "pipe-cutters," the object of the invention being to furnish a simple and effective tool, of improved construction, adapted for use in connection with a ratchet-brace, and which will form a compact and durable implement especially suitable for the use of gas-fitters or plumbers for cutting off pipes of relatively small sizes; also to so construct and organize the parts of said cutting-off tool that the same may be quickly assembled, and readily adjusted for adapting the tool to operate on pipes of different diameters.

In the drawings accompanying and forming a part of this specification, Figure 1 is a plan view of a cutting-tool embodying my invention. Fig. 2 is a vertical longitudinal section of the tool, taken on line $a$—$a$, Fig. 1, a portion of the tool being shown in side elevation. Fig. 3 is an end view of the tool, partially in section, looking toward the right-hand in Figs. 1 and 2. Fig. 4 is a vertical section of a portion of the body of the tool, with the cutter and other parts removed. Figs. 5 and 6 are elevations of the cutter-carrier as seen from different sides thereof. Fig. 7 is a cross-section of said carrier, taken in dotted line $b$—$b$, Fig. 6, looking from the under side in said figure.

Similar characters designate like parts in all the figures.

Briefly stated, my improved cutting-off tool comprises an axially and radially recessed or bored body adapted for carrying the several working parts of the tool, supporting and guiding rollers carried in said head, an adjustable cutter-carrier or slide, a revoluble cutter carried by said cutter-carrier, and means in connection with said cutter-carrier and tool-head for moving said cutter toward and from the axis of the head and for holding the same in adjusted position, as will be hereinafter fully described.

In the form thereof herein shown, the tool-body comprises a cylindrical head, B, and an axial extension or shank, C, said head and shank being axially bored as shown at 3 and 4, respectively, to form a pipe-receiving space or opening; the bore 3 of the head being preferably of a diameter slightly greater than that of the bore 4.

The head B is radially bored, as shown at 5, crosswise to the bore 3 thereof, which bore 5 is adapted to receive and guide a cutter-carrier or slide, D. This cutter-carrier is approximately of annular cross-section, it corresponding with, and fitting, the bore 5 in the head B. Said carrier is cut away at one side, as shown at 6, to form a flat bearing-face which is engaged by the inner edge, 7, of a cap, E, that is secured to the front end of the head B by suitable screws, 8, and is held against rotary movement in its seat by said cap. This cutter-carrier is longitudinally recessed at its lower end, as shown at 9, and is transversely bored, as shown at 10, to form bearings for the journals, 11, of the discous cutter 12, which cutter, as clearly shown in Fig. 2, is revolubly supported in the recess 9 between the walls thereof.

Located below or at one side of the axis of the cutter-head, are two anti-friction bearings, or rollers, 13, located in recesses, 14, one at each side of the radial bore 5, which rollers have journals, 13' and 13", respectively, seated in journal-bearings formed in the cap E and in the rear wall, 15, of the head B. These rollers act as revoluble supports for the material being cut, and also tend to press down the burr during the cutting operation.

As a means for adjusting the cutter-carrier and cutter toward and from the axis of the cutter-head, the rear side of the cutter-carrier is notched, as shown at 16, which notch is engaged by an annular flange, 17, upon an adjusting-screw, F, that fits a screw-threaded opening formed in the rear wall 15 of the cutter-head at one side of the cutter-carrier, and is provided with a head, 18, the lower face of which engages the upper face of the cutter-carrier and tends to prevent any possibility of the tilting of said carrier during the adjustment thereof. The head 18 of the adjusting-screw F is shown having a series of holes, 19, formed therein to receive a key or rod by means of which the adjusting-screw may be turned.

Located below and at opposite sides of the axis of the cutter-head in recesses 14, one at each side the radial bore 5, are rollers, 13, whose journals 13' and 13'' are seated in journal-bearings formed in the cap E and in the rear wall 15, respectively, of the head. These rollers act as revoluble supports for the material being cut and also tend to press down the burrs during the cutting operation.

In practice, the outer face of the head B will be rabbeted or annularly flanged, as shown at 21 in Figs. 2 and 4, and the cap E will be annularly flanged, as shown at 22, to fit the face of the head, this construction and organization preventing accidental lateral movement of said cap when secured to the head.

The lower end of the cutter-carrier D will be notched or cut away transversely, as shown at 23, to enable the same to partially straddle the pipe being cut.

The manner of adjusting the parts of and operating my improved cutting-off tool will be readily understood by those skilled in the art to which this invention appertains. Therefore a description of such operation is deemed unnecessary.

Having thus described my invention, I claim—

1. The herein described cutting tool consisting of the body-portion having the axially and radially-recessed or bored head, rollers revolubly-supported within said head at one side of the axial bore thereof, a peripherally-notched cutter-carrier fitted for longitudinal movement in the radial bore of the head, a discous cutter revolubly-carried by said carrier, an adjusting device located at one side of, and engaging in the notch of said carrier, and means for holding the carrier against rotary movement within the bore, substantially as described and for the purpose set forth.

2. The herein-described cutting-off tool, consisting of the body-portion having the axially-bored and radially-recessed head, a cutter-carrier, substantially as described, fitted for movement in said radial recess and having a flat bearing-face at one side and a notch at the opposite side thereof, an adjusting-screw having an annular flange in engagement with the notch of the cutter-carrier and adapted for moving said carrier toward and from the axis of the head, and means for preventing the rotation of the carrier, substantially as described and for the purpose set forth.

3. In a cutting-off tool, an axially-bored and radially-recessed head having a bored extension or shank with an annular head at the outer end thereof, a cutter-carrier adjustably seated in the radial recess of the head and having a flat outer face in alignment with the outer face of the head, a disk-cutter revolubly carried by said carrier, an adjusting-device in connection with the head and carrier and adapted for moving the carrier toward and from the axis of the head, a cap secured to the outer end of the head and bearing against the flat side of the cutter-carrier, and rollers revolubly located at one side of the axis of the head and supported at one end in bearings formed in the cap and at the other end in bearings formed in the head, substantially as described.

4. In a cutting-off tool, the combination with an axially- and radially-bored head, of a longitudinally-slotted cutter-carrier having a plain side-face in bearing-contact with a similar wall of said head, and having at the opposite side thereof a transverse groove, or notch, adapted to be engaged by an adjusting-device, a disk-cutter revolubly supported between the walls of the carrier, and an adjusting-screw connected with the head and having an annular flange in engagement with the side-notch of the carrier, substantially as described.

5. In a cutting-off tool, in combination, a body-portion comprising an axially- and radially-bored head and an axially bored shank having an angular section or extension, a centrally-bored cap secured to said head, a cutter-slide seated in the radial bore of the head and having a plain bearing-face in contact with the inner edge of the cap, and having a notch at the opposite face thereof, a discous cutter revolubly carried by said slide, rollers located below said cutter and journaled in bearings in the cap and rear-wall of the head, an adjusting-screw fitting a screw-threaded hole at one side of the cutter-slide and having an annular flange in engagement with the notch of said slide, and having a head in engagement with the upper face of said slide, substantially as described and for the purpose set forth.

WILLIAM W. TUCKER.

Witnesses:
FRED. J. DOLE,
CLARENCE L. GOODRICH.